G. H. ROBERTS.
ANIMAL BLEEDING APPARATUS.
APPLICATION FILED JULY 29, 1916.
1,226,598.
Patented May 15, 1917.
2 SHEETS—SHEET 1.
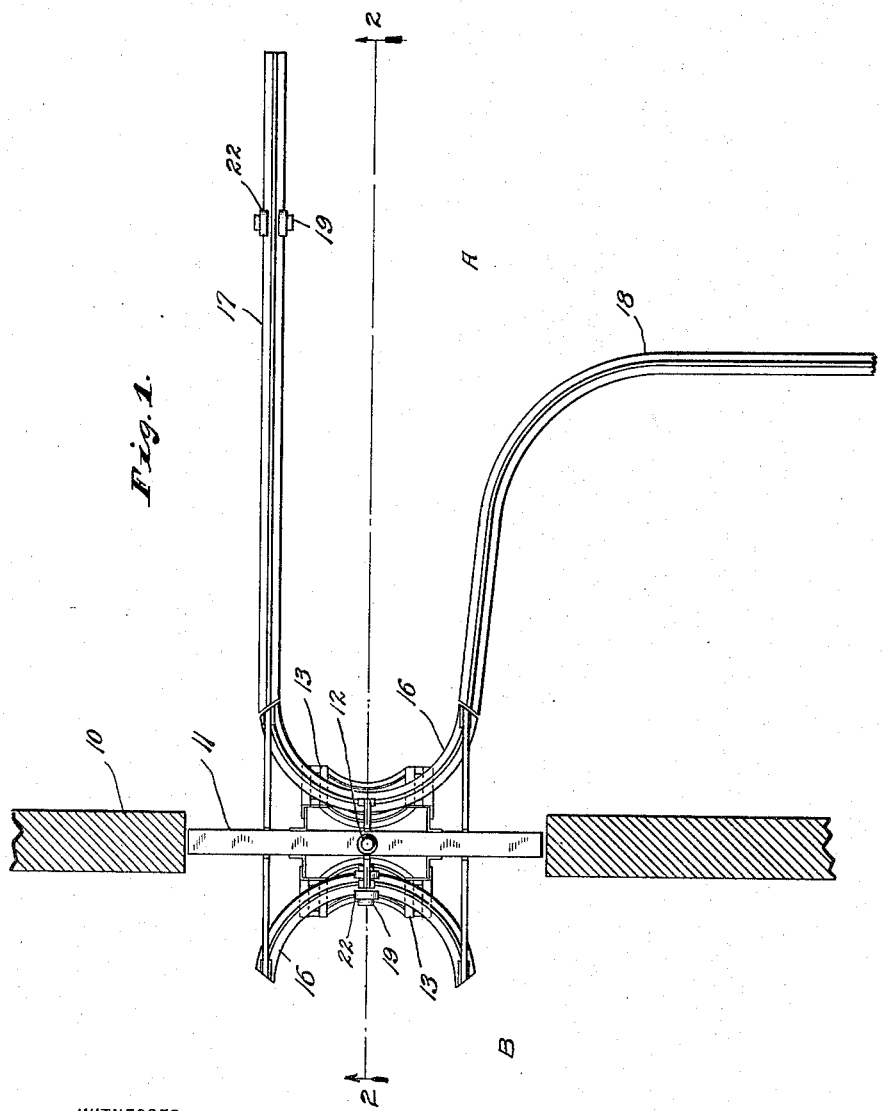
WITNESSES:
Frank A. Falile
Louise Bennett
INVENTOR
George H. Roberts,
BY
Hood & Schley
ATTORNEYS G. H. ROBERTS.
ANIMAL BLEEDING APPARATUS.
APPLICATION FILED JULY 29, 1916.
1,226,598.
Patented May 15, 1917.
2 SHEETS—SHEET 2.
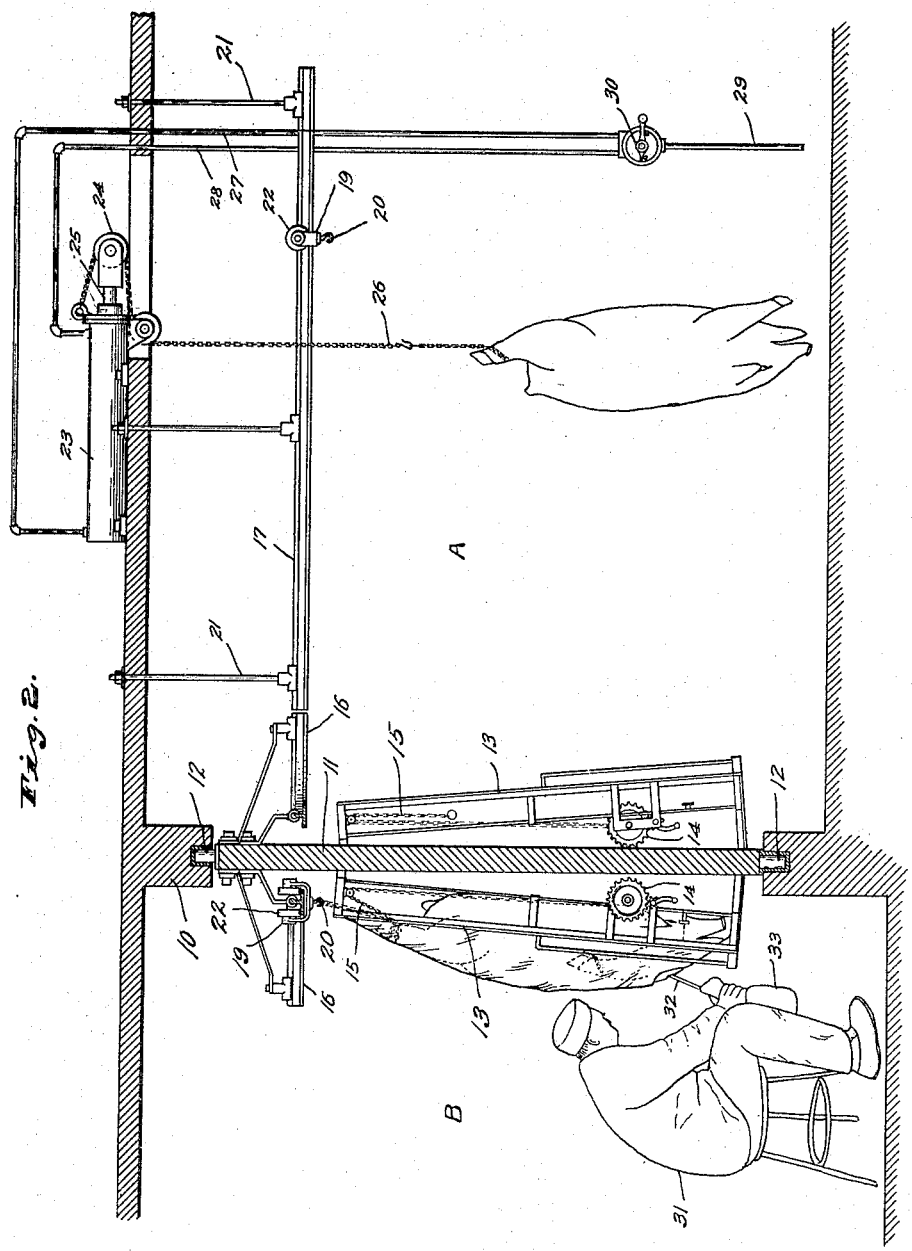
WITNESSES:
Frank A. Fahle
Louise Bennett
INVENTOR
George H. Roberts,
BY
Hood & Schley
ATTORNEYS

UNITED STATES PATENT OFFICE.

GEORGE H. ROBERTS, OF INDIANAPOLIS, INDIANA, ASSIGNOR TO PITMAN-MOORE COMPANY, OF INDIANAPOLIS, INDIANA, A CORPORATION OF INDIANA.

ANIMAL-BLEEDING APPARATUS.

1,226,598.   Specification of Letters Patent.   Patented May 15, 1917.

Application filed July 29, 1916. Serial No. 112,148.

*To all whom it may concern:*

Be it known that I, GEORGE H. ROBERTS, a citizen of the United States, residing at Indianapolis, in the county of Marion and State of Indiana, have invented a new and useful Animal-Bleeding Apparatus, of which the following is a specification.

It is the object of my present invention to provide a convenient apparatus for handling animals for final bleeding without possibility of contaminating the drawn blood.

In the manufacture of certain serums, viruses, and vaccines, the desired substance is developed in the blood of the living animal, and the blood is then drawn from the animal and suitably treated to obtain such substance. In some instances, the blood is drained from the animal's body, by piercing its jugular confluent, and this necessarily results in the death of the animal. In thus draining the blood from the animal, great care must be exercised to prevent contamination, so that the final product may be pure. My present invention enables this to be done with great convenience.

The accompanying drawings illustrate my invention.

Figure 1 is a plan view of a final bleeding apparatus embodying my invention; and Fig. 2 is a section on the line 2—2 of Fig. 1.

In the final bleeding operation, it is desirable, in order to prevent contamination, to prepare the animal in a separate room from that in which the bleeding is done. Therefore, the preparation room A is separated from the final bleeding room B by a partition or wall 10. In this partition or wall is a door 11, which is pivoted centrally on a vertical axis on pivot pins 12 at top and bottom, so that it can be rotated to bring either side of the door into either the preparation room A or the final bleeding room B.

Mounted on each side of the door 11 is an animal table 13, which is preferably slightly inclined from the vertical so as to hold the animal in a similarly inclined position. The details of this table are not essential here, but preferably the table is of the type shown in my Patent No. 1,181,615, dated May 2, 1916, save that the animal bed is rigidly fastened to the door 11 instead of being tiltably mounted on a base. It is sufficient to explain here that the animal table consists of a skeleton framework having a vertical trough or groove for receiving the animal's body, and may be provided with a windlass 14 for operating a lifting chain 15 by which the animal may be raised and lowered on the table 13 and with suitable fastening means for holding the animal tight against the table.

Supported above the table 13 on each side of the door 11 is a curved section 16 of any suitable form of track, which when the door 11 is turned so as to bring such section in the preparation room A registers at its two ends with suitably supported track sections 17 and 18 of similar forms, the sections 17 and 18 being conveniently hung from the ceiling of the preparation room A. Suitable carriages 19 travel on the track sections 17, 16, and 18, and are provided at their underhanging ends with hooks 20 for coöperating with a chain suitably attached to the animal to be bled so as to hang such animal head downward from the carriage 19. In the form shown, the track sections are of a general inverted T-shape, with the stem of the T extending upward for attachment to the supports 21, and the carriages 19 have rollers 22 which travel on the cross of the T on each side of the stem.

When the animals are heavy, as for instance when hogs are used, a power-lifting device is provided for lifting them to the carriages 19. The form shown is a fluid-pressure cylinder 23 by which a roller 24 on the end of a piston rod 25 is moved outward or inward to raise and lower a lifting chain 26, the supply of fluid to the two ends of the chain 23 being by way of two pipes 27 and 28 to which the supply of fluid pressure from a main supply pipe 29 is controlled by a suitable valve 30.

In operation, the chain 26 is lowered and attached to an animal in the preparation room A, and then raised to lift the animal to a carriage 19, which has been placed on the track section 17. When the animal is thus raised, it is suitably hung from the hook 20 of such carriage 19, and the carriage is pushed along the track section 17 and on to the track section 16, so that the animal is brought to the animal table 13 which at that time is in the preparation room A. It is most convenient to lift the animals and carry them by their hind legs, so that they hang head downward. When the animal is brought to the animal table 13, it is suitably fastened thereon with its ventral portion outward, first being raised if necessary to the desired height by the windlass 14. Then, if desired, a suitable protective covering is placed over it, to leave only its throat exposed. When the animal is suitably arranged on the table 13, the door 11 is rotated on its pivot pins 12 to carry this table 13 with the animal thereon into the final bleeding room B, at the same time bringing the other table 13 into the preparation room A.

Another animal is now lifted on to another carriage 19, carried thereby to this second table 13, and suitably arranged thereon, in the same manner as before. In the meantime, the operator 31 in the final bleeding room B thrusts a hollow handled final bleeding knife 32, such for instance as shown in my Patent No. 1,150,387, dated August 17, 1915, into the animal's throat to pierce its jugular confluent, so that the blood will drain from the animal through the hollow handle of the knife into a suitable receptacle 33.

When the body of the animal in the final bleeding room has been drained of blood and another animal has been placed in position on the table 13 in the preparation room, the door 11 is swung again to carry the dead animal from the final bleeding room to the preparation room and the live animal from the preparation room to the final bleeding room. The live animal is then bled, in the manner described, the dead animal is released from the table 13 to which he was fastened and carried by the carriage 19 from the track section 16 on to the track section 18 and therealong to any desired point of disposal, and another animal is caught, lifted to a carriage 19 on the track section 17, and carried to and suitably arranged on the table 13 from which the dead animal has just been removed.

Thus while one animal is being bled, its successor is being prepared and the body of its predecessor is being disposed of; and the whole operation is carried out simply and expeditiously, without danger of bringing any contamination into the final bleeding room, so that the blood drawn from the animal may be pure. The blood thus drawn is suitably treated to obtain the desired substance which has been developed therein.

I claim as my invention:

1. An animal bleeding apparatus, comprising a wall having a door pivoted therein to swing about a vertical axis, and an animal-supporting table mounted on each side of said door so that by the swinging of the door either table may be brought to either side of said wall, said animal-supporting table being arranged to support the animal in vertical position for bleeding.

2. An animal bleeding apparatus, comprising a wall having a door pivoted therein, and an animal-supporting table mounted on each side of said door so that by the swinging of the door either table may be brought to either side of said wall, said animal-supporting table being arranged to support the animal in vertical position for bleeding.

3. An animal bleeding apparatus, comprising a wall having a door pivoted therein to swing about a vertical axis, and an animal-supporting table mounted on said door so that by the swinging of the door said table may be brought to either side of said wall, said animal-supporting table being arranged to support the animal in vertical position for bleeding.

4. An animal bleeding apparatus, comprising a wall having a door pivoted therein, and an animal-supporting table mounted on said door so that by the swinging of the door said table may be brought to either side of said wall, said animal-supporting table being arranged to support the animal in vertical position for bleeding.

5. An animal bleeding apparatus, comprising a wall having a door pivoted therein to swing about a vertical axis, an animal-supporting table mounted on each side of said door so that by the swinging of the door either table may be brought to either side of said wall, said animal-supporting table being arranged to support the animal in vertical position for bleeding, and means on one side of the wall for bringing an animal into position to be attached to the table on that side of the door which at that time is on that side of the wall.

6. An animal bleeding apparatus, comprising a wall having a door pivoted therein, an animal-supporting table mounted on each side of said door so that by the swinging of the door either table may be brought to either side of said wall, said animal-supporting table being arranged to support the animal in vertical position for bleeding, and means on one side of the wall for bringing an animal into position to be attached to the table on that side of the door which at that time is on that side of the wall.

7. An animal bleeding apparatus, comprising a wall having a door pivoted therein to swing about a vertical axis, an animal-supporting table mounted on said door so that by the swinging of the door said table may be brought to either side of said wall, said animal-supporting table being arranged to support the animal in vertical position for bleeding, and means on one side of the wall for bringing an animal into position to be attached to the table on the door.

8. An animal bleeding apparatus, comprising a wall having a door pivoted therein, an animal-supporting table mounted on said door so that by swinging of the door said table may be brought to either side of said wall, said animal-supporting table being arranged to support the animal in vertical position for bleeding, and means on one side of the wall for bringing an animal into position to be attached to the table on the door.

9. An animal bleeding apparatus, comprising a wall having a door pivoted therein to swing about a vertical axis, an animal-supporting table mounted on each side of said door so that by the swinging of the door either table may be brought to either side of said wall, a track section mounted on each side of said door above the operating table so as to turn with the door, a fixed track section with which the track section on the door registers respectively when on one side of the wall, and animal-carrying carriages for traveling on said track sections and passing to and from the track sections on the door from and to the fixed track section.

10. An animal bleeding apparatus, comprising a wall having a door pivoted therein, an animal-supporting table mounted on each side of said door so that by the swinging of the door either table may be brought to either side of said wall, a track section mounted on each side of said door above the operating table so as to turn with the door, a fixed track section with which the track sections on the door register respectively when on one side of the wall, and animal-carrying carriages for traveling on said track sections and passing to and from the track sections on the door from and to the fixed track section.

11. An animal bleeding apparatus, comprising a wall having a door pivoted therein to swing about a vertical axis, an animal-supporting table mounted on said door so that by the swinging of the door said table may be brought to either side of said wall, a track section mounted on said door above the operating table so as to turn with the door, a fixed track section with which the track section on the door registers when on one side of the wall, and animal-carrying carriages for traveling on said track sections and passing to and from the track section on the door from and to the fixed track section.

12. An animal bleeeding apparatus, comprising a wall having a door pivoted therein, an animal-supporting table mounted on said door so that by the swinging of the door said table may be brought to either side of said wall, a track section mounted on said door above the operating table so as to turn with the door, a fixed track section with which the track section on the door registers when on one side of the wall, and animal-carrying carriages for traveling on said track sections and passing to and from the track section on the door from and to the fixed track section.

13. An animal bleeding apparatus, comprising a wall having a door pivoted therein to swing about a vertical axis, an animal-supporting table mounted on each side of said door so that by the swinging of the door either table may be brought to either side of said wall, a track section mounted on each side of said door above the operating table so as to turn with the door, a fixed track section with which the track section on the door registers respectively when on one side of the wall, animal-carrying carriages for traveling on said track sections and passing to and from the track sections on the door from and to the fixed track section, and lifting means for lifting an animal into position for attachment to said animal-carrying carriages on said fixed track sections.

14. An animal bleeding apparatus, comprising a wall having a door pivoted therein, an animal-supporting table mounted on each side of said door so that by the swinging of the door either table may be brought to either side of said wall, a track section mounted on each side of said door above the operating table so as to turn with the door, a fixed track section with which the track sections on the door register respectively when on one side of the wall, animal-carrying carriages for traveling on said track sections and passing to and from the track sections on the door from and to the fixed track section, and lifting means for lifting an animal into position for attachment to said animal-carrying carriages on said fixed track sections.

15. An animal bleeding apparatus, comprising a wall having a door pivoted therein to swing about a vertical axis, an animal-supporting table mounted on said door so that by the swinging of the door said table may be brought to either side of said wall, a track section mounted on said door above the operating table so as to turn with the door, a fixed track section with which the track section on the door registers when on one side of the wall, animal-carrying carriages for traveling on said track sections and passing to and from the track section on the door from and to the fixed track section, and lifting means for lifting an animal into position for attachment to said animal-carrying carriages on said fixed track sections.

16. An animal bleeding apparatus, comprising a wall having a door pivoted therein, an animal-supporting table mounted on said door so that by the swinging of the door said table may be brought to either side of said wall, a track section mounted on said door above the operating table so as to turn with the door, a fixed track section with which the track section on the door registers when on one side of the wall, animal-carrying carriages for traveling on said track sections and passing to and from the track section on the door from and to the fixed track section, and lifting means for lifting an animal into position for attachment to said animal-carrying carriages on said fixed track sections.

In witness whereof, I have hereunto set my hand at Indianapolis, Indiana, this twenty-eighth day of June, A. D., one thousand nine hundred and sixteen.

GEORGE H. ROBERTS.

Copies of this patent may be obtained for five cents each, by addressing the "Commissioner of Patents, Washington, D. C."